(12) United States Patent
Karjoth et al.

(10) Patent No.: US 7,847,696 B2
(45) Date of Patent: Dec. 7, 2010

(54) DETECTING A BLOCKER RFID TAG

(75) Inventors: Guenter Karjoth, Waedenswil (CH); Luke O'Connor, Adliswil (CH); Michael Backes, Rentrisch (DE)

(73) Assignee: International Business Machines Corporation, Armonk, NY (US)

( * ) Notice: Subject to any disclaimer, the term of this patent is extended or adjusted under 35 U.S.C. 154(b) by 133 days.

(21) Appl. No.: 12/190,258

(22) Filed: Aug. 12, 2008

(65) Prior Publication Data

US 2008/0316001 A1 Dec. 25, 2008

Related U.S. Application Data

(63) Continuation of application No. 11/410,428, filed on Apr. 25, 2006, now abandoned.

(30) Foreign Application Priority Data

Apr. 25, 2005 (EP) .................... 05405315

(51) Int. Cl.
*G08B 13/14* (2006.01)
(52) U.S. Cl. ............ 340/572.4; 340/572.1; 340/10.31
(58) Field of Classification Search .......... 340/572.1, 340/572.4, 568.1, 10.1, 10.2, 10.35, 10.42, 340/10.5, 10.31; 235/375, 384; 455/1
See application file for complete search history.

(56) References Cited

U.S. PATENT DOCUMENTS

| 6,967,564 | B2 | 11/2005 | Hulvey |
| 6,992,587 | B2 | 1/2006 | Maeda et al. |
| 7,042,359 | B2 * | 5/2006 | Clucas .................. 340/572.1 |
| 7,142,120 | B2 * | 11/2006 | Charych et al. ......... 340/572.4 |
| 7,173,518 | B2 * | 2/2007 | Hulvey .................. 340/10.31 |
| 7,224,277 | B2 | 5/2007 | Kunito et al. |
| 7,248,145 | B2 * | 7/2007 | Littlechild et al. ........ 340/10.5 |
| 7,535,361 | B2 * | 5/2009 | Doan et al. ............. 340/572.4 |
| 2004/0142655 | A1 * | 7/2004 | Voegele .................... 455/1 |

OTHER PUBLICATIONS

A. Juels et al., "The Blocker Tag: Selective Blocking of RFID Tags for Consumer Privacy;" CCS '03; Oct. 27-30, 2003; Washington DC, USA.

* cited by examiner

*Primary Examiner*—Van T. Trieu
(74) *Attorney, Agent, or Firm*—Cantor Colburn LLP; Vazken Alexanian

(57) ABSTRACT

For detecting a blocker RFID tag, the following steps are conducted. First, a random identifier of a given bit length is created. Alternatively, an identifier is selected out of a probing set, which is stored on a data storage device. The probing set comprises of identifiers, which are not being used as identifiers for a given set of RFID tags. In a second step, a response from all RFID tags is requested having an identifier matching the random identifier or, respectively, the selected identifier. In a third step, it is determined, depending on receiving or not receiving a response, whether the blocker RFID tag is present.

18 Claims, 3 Drawing Sheets

DETECTING A BLOCKER RFID TAG

CROSS REFERENCE TO RELATED APPLICATIONS

The present application is a continuation of U.S. application Ser. No. 11/410,428, filed Apr. 25, 2006, now abandoned, which in turn claims priority to EPO application 05405315.2, filed Apr. 25, 2005.

TECHNICAL FIELD

The present invention relates to a method for detecting a blocker RFID tag. It further relates to a device for detecting a blocker RFID tag. RFID refers to Radio Frequency Identification.

BACKGROUND OF THE INVENTION

RFID tags are available in different materials and shapes. They typically comprise a microchip with an antenna for communicating with readers over a radio frequency, and a storage device, in which a full identifier is stored. When requested by a reader, an RFID tag responds by transmitting its full identifier. It may, however, also upon request just transmit part of its full identifier. There have been approaches of standardizing the full identifiers of RFID tags. Such an approach is the so-called EPC global standard. EPC stands for Electronic Product Code, which is an identification scheme designed to enable the unique identification of all physical objects. The EPC code ranges from 64 to 256 bits in length, which encodes four distinct information fields. In case of the EPC 96-bit code, the first field (the header) is defined for bits 0 to 7 and indicates the length of the code. The second field is the so-called EPC manager covering, for example, bits 8 to 35 and typically contains information about the manufacturer of the product the RFID tag is attached to. The third field is the so-called object class, covering, for example, bits 36 to 59 and referring to the exact type of product in the same manner as a stock keeping unit. The fourth field is referred to as the serial number and may cover bits 60 to 96. This fourth field provides a unique 36-bit identifier for individual products depending on the length of the EPC code. It may be possible to individually mark every product with a unique full identifier.

Passive RFID tags are a class of simple tags that when queried by a reader will respond with their tag information (identifier). Such tags typically have minimal computational logic, and receive power from the readers, and are relatively cheap to manufacture. Many business cases for the deployment of RFID technology in supply chains are predicated on the widespread deployment of passive tags to replace manual inventorying solutions based on bar code systems. RFID technology enables the tracking of individual products through production, distribution and sale, when RFID readers are installed at various locations in the supply chain. Further, in retail stores, RFID tagging may reduce the time required to actually pay for goods a consumer intends to purchase by extracting the pricing information automatically, and thus rendering it unnecessary to take the goods out of a shopping cart.

The usefulness of RFID technology directly depends on the quantity and accuracy of the tag information collected by readers. Business processes that depend on RFID information for their successful and timely completion can be disrupted by "malicious" tags that introduce spurious information to a reader or block genuine information from reaching a reader. The integrity of business processes that depend on RFID tag information can be protected if there are methods to quickly identify and isolate malicious tags.

However, there are also security and privacy concerns related to RFID. The paper, "An Introduction to RFID-Information Security And Privacy Concerns" by Björn Johannsen explains basic RFID concepts and also considers the problem of information security. There are security and privacy concerns both for the supply chain, and also for consumers who purchase goods containing passive RFID tags.

With respect to supply chains, the usefulness of RFID technology directly depends on the quantity and accuracy of the tag ID information collected by readers. Business processes that depend on RFID information for their successful and timely completion can be disrupted by "malicious" tags that introduce spurious information to a reader or block genuine information from reaching a reader. The integrity of business processes that depend on RFID tag information can be protected if there are methods to quickly identify and isolate malicious tags.

With respect to consumers, one threat that has been identified with the introduction of passive tags into consumer products is that consumer privacy may be eroded. The issue here that passive tags are still able to transmit their identification information beyond the point of sale, and in fact will willingly disclose this information to any (compatible) reader. While this may be considered an advantage in the supply chain for consumer products, most consumers do not want the tag information associated with their purchases to be read by readers placed in other stores, or in public places in general. Since passive tags transmit the same information for each read request, it is possible for a consumer to be physically tracked by the reading of tag information associated with their purchases. The tags could also reveal consumer purchasing preferences.

The Blocker Tag is a technology for preventing tag information from being read by a reader unknown to a person carrying one or several tagged items. Read requests to a tag could be physically blocked by simply jamming the radio transmission between a tag and a reader. The Blocker Tag prevents tag reading not by jamming the transmission channel, but rather by preventing the read protocol between the tag and the reader from completing. In what follows, an introduction to RFID read protocols and an explanation of the operation of the Blocker Tag is given.

Many RFID applications require a reader to read all tags that are currently in its proximity, sometimes referred to as inventorying the tag population (of the reader). The channel between the reader and its tags is a broadcast channel, and the channel from tags to the reader only supports one tag sending at a time. If multiple tags send their information during the same time instance then a collision occurs and typically no tag information can be recovered by the reader. The reader must then use an anti-collision protocol whose purpose is to singulate (or isolate) each tag in turn, so that the singulated (or isolated) tag can send its information while the other tags remain silent (until they in turn are singulated).

A common singulation method is the so-called tree-walking singulation algorithm. The tree-walking singulation algorithm enables the reader to identify the serial numbers of nearby tags individually by means of a bit-by-bit query process resembling a depth-first search of a binary tree. If the RFID tags in a given system bear unique identifiers of some fixed bit length k, then the set of all possible k-bit identifiers can be viewed as the leaves of a standard binary tree of depth k. The root of this tree has a depth of 0 and is labeled with the empty string. A node of depth d is labeled with a binary string x of length d. If d is smaller than k, then the node has two children at depth d+1: a "left child" with label x0 (x‖0) and a "right child" with label x1 (x‖1). One may regard the branches (children) of a given node in this tree as bearing labels "0" and "1", respectively associated with the left and right branches. Thus a node at depth d in this tree may be uniquely identified by a binary prefix $B = b_1 b_2 \ldots b_d$, representing the sequence of branches traversed in a path from the root to the node. It follows that each of the $2^k$ leaves in the tree is associated with a unique k-bit string. Each such leaf may be viewed as a unique k-bit string that could be allocated to the serial number of a tag.

Given this interpretation of the tags identifiers to be read, the tree-walking algorithm proceeds as follows. The basic step of the algorithm is for the reader to broadcast a prefix B to all tags. Each tag receives B, and if B is a prefix of its identifier, the tag then transmits information to the reader. Each tag makes this decision independently. The reader waits for responses and observes one of three outcomes:

No responses: meaning no tag had B as a prefix. In this case B cannot be used to singulate a tag, so the reader selects a new value of B.

One response: meaning that exactly one tag (say T) has B as a prefix. The reader can now use B to address B uniquely, and can read the tag information from T while the other tags remain silent. Once T has been read, the reader can select a new value of B and singulate any remaining unread tags.

A collision occurs: meaning that more than one tag matches B as a prefix. In this case B is too general (that is, too short) to singulate a single tag, and therefore B must be extended. The reader then attempts to singulate tags using the prefixes B‖0 and B‖1.

In practice, the values of B are chosen to perform a recursive depth-first search of the binary tree defined by the tags identifiers to be read, which is equivalent to walking a binary tree. Initially the prefix B is set to the empty string (of zero length), which matches all tags identifiers, and then extended to 1 and 0 initially. The full output of the tree-walking algorithm is a list of the ID numbers of all RFID tags within range. The running time of this algorithm is bounded by the product of k and the number of tags being read. In practice, a shopping cart full of goods should be scannable in a few seconds. Importantly, the tags must follow the protocol to guarantee the singulation of each tag. In particular, when B is not a prefix of a tag's identifier, then the tag must remain silent.

The main use of a blocker tag is to maintain the privacy of a person in possession of passively tagged goods, where the privacy of the person may be threatened if the information contained these tags can be extracted by any readers sufficiently close to the person. Blocker tags interfere with the tree-walking singulation algorithm by participating in singulation protocol in non-compliant manner, which may be thought of as a type of passive jamming. If a reader broadcasts a given prefix B, and detects a collision, then the reader extends B and makes another request, eventually expecting a singulation. However, the blocker tag is designed to respond to every prefix broadcast from a reader, so if another tag responds to the same request, then a collision will be generated. In particular, if the blocker tag is protecting the identifier of a given tag T, then each response from T will result in a collision since the blocker tag will also be responding. So the blocker tag "blocks" information from being read by generating collisions in the RF channel. In this manner, for each request the reader either detects a collision (and gains no information about the tags responding) or only reads the information sent by the blocker tag (and still gains no information about the other tags). When the reader attempts to resolve a detected collision by extending the prefix, the blocker tag will cause another collision for the extended prefix, and so on.

A blocker tag effectively overwhelms the tree-walking singulation algorithm by forcing it to sweep the full space of all possible RFID tag identifiers. If the reader had enough time, memory, and processing power to complete the tree-walking algorithm in these circumstances, it would output the entire set of all $2^k$ possible tag serial numbers. This set is very large, however—a size of at least $2^{64}$ in even the most basic system—and the reading process is designed to execute very rapidly. In practice, therefore, the reader may be expected to stall after reaching only a few hundred leaves in the tree. A net effect is that the full blocker tag blocks the reading of all other RFID tags.

The blocker tag may, however, also be designed to selectively block only a given range of identifiers, and to remain silent otherwise. A blocker RFID tag is referred to as "a full blocker" or "a universal blocker" if it simulates the full set of all $2^k$ possible RFID tag serial numbers. Thanks to the structure of the tree-walking algorithm, such blocking may be accomplished quite easily. Whenever the reader queries RFID tags in the subtree of a given node b for the next bit value, the blocker RFID tag simultaneously broadcasts both a "0" bit and a "1" bit. The blocker RFID tag may require two antennae to do this. This forced collision drives the reader to recourse on all nodes, causing the reader to explore the entire binary tree.

The blocker RFID tag may also be refined so as to simulate and, therefore, effectively block just a subset of tags. Such a blocker RFID tag may be referred to as "partial" blocker RFID tag or a "selective" blocker RFID tag. For example, a selective blocker RFID tag might reply to the reader only during execution of the tree-walking in the left subtree of the root. This selective-blocking feature will have the effect of obstructing only the reading of tags that bear a "0" prefix in their serial numbers. RFID tags with serial numbers that begin with a "1" bit could be read without interference. In this manner, the selective blocker RFID tag can target a particular zone for protection.

While blocker tags can be used to protect the privacy of information contained on (passive) RFID tags, unfortunately the same idea has malicious applications. If a (universal) blocker tag is protecting (blocking) the information on tag T from being read, it will in fact block information block all tags in the range of the reader. This is because the blocker tag responds to all broadcasted prefixes, not just the prefixes that match with the identifier of T. Because of this property, blocker tags may be used maliciously, for example, to subvert RFID applications that rely on the quantity and accuracy of the information collected by readers. The tagged goods may be in the range of the reader, but the blocker tag prevents the reader from extracting the identifiers of the goods.

It is a challenge to provide a simple method for detecting the presence of blocker RFID tags amongst the collection of RFID tags within the range of a reader. It is furthermore a challenge to provide a device for detecting a blocker RFID tag, which enables in a simple way the detection of blocker RFID tags.

SUMMARY OF THE INVENTION

Therefore, according to one aspect of the invention, a method for detecting a blocker RFID tag is provided that comprises the steps of first creating a random identifier of a given bit length. The random identifier may thus be a full identifier of the RFID tag, which may be in the case of the EPC standard, for example, a bit length of 96 bits. It may also be just part of the full identifier. In a second step, a response from all RFID tags having an identifier matching the random identifier is requested. In the third step, it is determined depending on receiving or not receiving a response whether a blocker RFID tag is present.

In an advantageous embodiment of the method, it comprises repeatedly conducting the first and second steps and determining, depending on an amount of received or not received responses, whether a blocker RFID tag is present. In this way, the probability of correctly detecting blocker tags is even more increased. In addition to that, a selective blocker tag may be more reliably detected.

According to a second aspect, a method for detecting a blocker RFID tag is provided comprising the steps of first selecting one identifier out of a probing set being stored on a data storage device, said probing set comprising identifiers, which are not being used as identifiers for a given set of RFID tags. In a second step, a response from all RFID tags is requested having an identifier matching the selected identifier. In a third step, it is determined, depending on receiving or not receiving a response, whether a blocker RFID tag is present. In this way, the insight is used that the number space of the respective full identifiers of the RFID tags is generally extremely large.

According to a third aspect of the invention, a device for detecting a blocker RFID tag is provided, the device being designed for first creating a random identifier of a given bit length, for secondly requesting a response from all RFID tags having an identifier matching the random identifier and for thirdly determining, depending on receiving or not receiving a response whether a blocker RFID tag is present.

According to a fourth aspect of the invention, a device for detecting a blocker RFID tag is provided, which is designed for conducting the steps of first selecting one identifier out of a probing set being stored on a data storage device, said probing set comprising identifiers, which are not being used as identifiers for a given set of RFID tags, and third requesting a response from all RFID tags having an identifier matching the selective identifier and third determining, depending on receiving or not receiving a response, whether a blocker RFID tag is present.

The advantages of the third and fourth aspect of the invention correspond to the advantages of the first and second aspect of the invention.

BRIEF DESCRIPTION OF THE DRAWINGS

The invention and its embodiments will be more fully appreciated by reference to the following detailed description of presently advantageous but nonetheless illustrative embodiments in accordance with the present invention when taken in conjunction with the accompanying drawings, in which.

DESCRIPTION OF SYMBOLS

Figure 1:
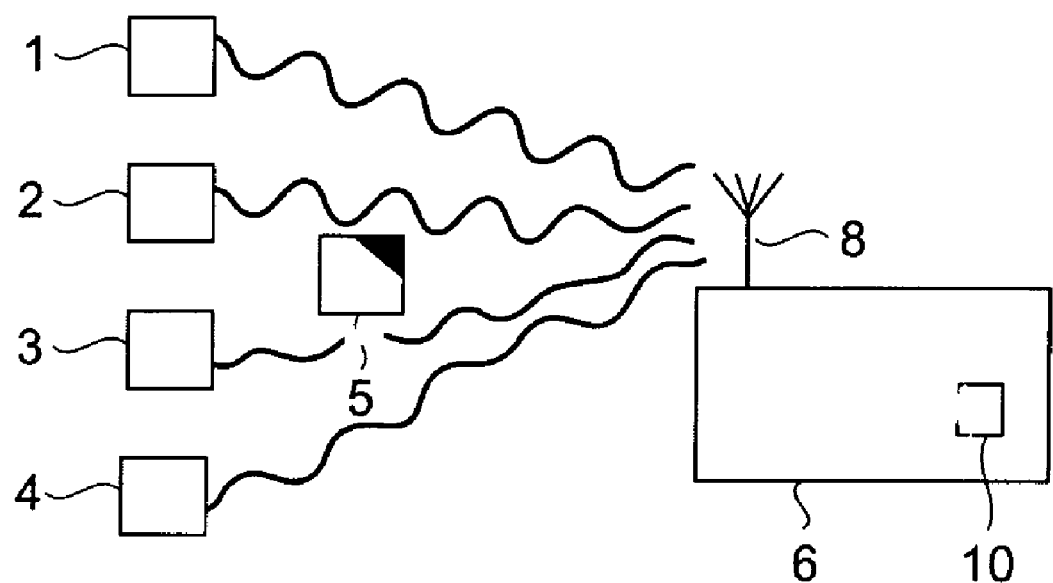
FIG. 1 shows an RFID tag system with a reader unit.

1-4 Regular RFID tag
5 Blocker RFID tag
6 Reader unit
8 Antenna
10 data storage device
BL bit length
BL1 first bit length
RAN_ID random identifier
REQ Request
CTR counter
COLL collision
BL_ADD additional bit length
RESP response
BT blocker RFID tag marker
BT[ ] blocker RFID tag marker array
TRUE true value
FALSE false value
CTR_MAX maximum value
i placeholder
PS probing set
ID_S selected identifier
t given time
t_max maximum time value

DETAILED DESCRIPTION OF THE INVENTION

The present invention provides methods for detecting a blocker RFID tag is provided that comprises the steps of first creating a random identifier of a given bit length. The random identifier may thus be a full identifier of the RFID tag, which may be in the case of the EPC standard, for example, a bit length of 96 bits. It may, however, also be just part of the full identifier, which includes that the random identifier may also not contain the leading bit but rather be positioned somewhere in the given bit positions of the full identifier. In a second step, a response from all RFID tags having an identifier matching the random identifier is requested. In the third step, it is determined depending on receiving or not receiving a response whether a blocker RFID tag is present.

By appropriately choosing a given bit length, for example, by choosing a given bit length of 64 bit, the probability of having a regular RFID tag which matches the created random identifier is extremely small and, therefore, a response renders it highly likely that a blocker RFID tag is present. Therefore, blocker RFID tags may be detected with little effort and very efficiently. In this respect, it is not required to keep a list of "good" identifiers of RFID tags. Only a random number generator is necessary. In addition to that it is not necessary to have an on-line connection with a back-end database to check the identifier of a scanned RFID tag. Furthermore, it is not necessary to have cooperation between a manufacturer employing the regular RFID tags for its products and an organization hosting the reading process.

In an advantageous embodiment of the method, it comprises repeatedly conducting the first and second steps and determining, depending on an amount of received or not received responses, whether a blocker RFID tag is present. In this way, the probability of correctly detecting blocker tags is even more increased. In addition to that, a selective blocker tag may be more reliably detected.

In a further advantageous embodiment of the method, it comprises repeatedly conducting the first and second steps and varying the given bit length. In this way, it may be even harder for smart blocker-tags to recognize that it is tried to detect a blocker RFID tag.

In a further advantageous embodiment of the method, the first step is conducted by creating the random identifier with a given first bit length. The second step is conducted and upon receiving a response signaling a collision of at least two RFID tags responding simultaneously, the random identifier is modified by adding a given amount of bits having a random value. Then, the second step is again conducted with the modified random identifier and it is determined depending on receiving or not receiving a response whether a blocker RFID tag is present. This has the advantage that the first bit length may be appropriately significantly shorter than the full bit length of the full identifier, which causes less effort of conducting the method in case of the absence of the blocker RFID tag. It ensures at the same time by appropriately choosing the length of the added bits that the presence of the blocker RFID tag may with a very high probability be detected.

The present invention also provides methods for detecting a blocker RFID tag is provided comprising the steps of first selecting one identifier out of a probing set being stored on a data storage device. The probing set comprising identifiers, which are not being used as identifiers for a given set of RFID tags. In a second step, a response from all RFID tags is requested having an identifier matching the selected identifier. In a third step, it is determined, depending on receiving or not receiving a response, whether a blocker RFID tag is present. In this way, the insight is used that the number space of the respective full identifiers of the RFID tags is generally extremely large. A manufacturer may in many cases not use its full number space, which he is assigned to. Therefore, it is very simple and reliable to use at least part of this unused number space for detecting the presence of the blocker RFID tag, as none of the regular RFID tags would respond to an identifier, which is not used as identifier for the given set of RFID tags. Therefore, this enables a very reliable identification of the blocker RFID tag.

In an advantageous embodiment of the invention, the method comprises repeatedly conducting said second and third steps and determining, depending on an amount of received or not received responses, whether a malicious RFID tag is present. This may ensure an even more reliable detection of a selective blocker RFID tag.

In a further advantageous embodiment of the invention, the probing set is a subset of all identifiers, which are not used as identifiers for the given set of RFID tags. This enables that only a small number of the identifiers, which are not being used as identifiers for the given set of RFID tags, need to be stored on the storage device, which has the positive effect that not that much memory space is used. It further has the advantage that possible attackers do not have access to all identifiers which are not being used as identifiers for the given set of RFID tags.

In a further advantageous embodiment of the invention, the method comprises storing a modified probing set of identifiers, which are not being used as identifiers for the given set of RFID tags, when a given time-related condition is fulfilled. This would even more increase the overall safety, as attackers would be faced from time to time again with new identifiers they could not spy out before.

In a further advantageous embodiment of the invention, the probing set comprises a given number of identifiers being larger than the number of identifiers being possibly stored in the blocker RFID tags. This has the advantage that it is impossible for the blocker RFID tag to store all identifiers of the probing set.

The present invention also provides devices for detecting a blocker RFID tag is provided. A device being designed for first creating a random identifier of a given bit length, for secondly requesting a response from all RFID tags having an identifier matching the random identifier and for thirdly determining, depending on receiving or not receiving a response whether a blocker RFID tag is present.

In an advantageous embodiment of the invention, the device is designed for repeatedly conducting the first and second steps and determining, depending on an amount of received or not received responses, whether a blocker RFID tag is present.

In a further advantageous embodiment of the invention, the device is designed for repeatedly conducting the first and second steps and varying the given bit length.

In a further advantageous embodiment of the invention, the device is designed for conducting the first step by creating the random identifier with a given first bit length and conducting the second step. It is furthermore designed for upon receiving a response signal in collision of at least two RFID tags responding simultaneously to modify the random identifier by adding a given amount of bits having a random value and conducting the second step with the modified random identifier and determining depending on receiving or not receiving a response whether a blocker RFID tag is present.

The present invention also provides devices for detecting a blocker RFID tag is provided, which are designed for conducting the steps of first selecting one identifier out of a probing set being stored on a data storage device. The probing set comprising identifiers, which are not being used as identifiers for a given set of RFID tags, and third requesting a response from all RFID tags having an identifier matching the selective identifier and third determining, depending on receiving or not receiving a response, whether a blocker RFID tag is present.

In an advantageous embodiment of the invention, a device is designed for repeatedly conducting the second and third steps and determining, depending on an amount of received or not received responses, whether the blocker RFID tag is present.

In a further advantageous embodiment of the invention, the device is designed for the probing set being a subset of all identifiers which are not being used as identifiers for the given set of RFID tags.

In a further advantageous embodiment of the invention, the device is designed for storing a modified probing set of identifiers, which are not being used as identifiers for the given set of RFID tags, when a given time-related condition is fulfilled.

In a further advantageous embodiment of the device is designed for the probing set comprising a given number of identifiers being larger than a number of identifiers being possibly stored in the blocker RFID tag.

FIG. 1 shows an RFID tag system. It comprises several regular RFID tags 1 to 4, of which four are by way of example shown here, they may, however, also be present in a way larger number of, for example, 200 regular RFID tags. In addition to that, a blocker RFID tag 5 is present.

The regular RFID tags are RFID tags with identifiers with valid identification numbers for the given business process. They may have full identifiers, which comply, for example, to the EPC (Electronic Product Code) standard. The electronic product code ranges from 64 bits to 256 bits with four distant fields. The manufacturer of goods, to which the regular RFID tags 1 to 4 may be attached, may have allocated certain parts of the full identifier individually to each of the regular RFID tags. The blocker tag 5 may either be a universal blocker RFID tag or it may also just be a selective blocker RFID tag. It may contain a given memory space for storing data. In particular the blocker RFID tag may be a malicious RFID tag.

In addition to that, a reader unit 6 is present, which comprises an antenna 8 for transmitting and receiving signals to and from the regular RFID tags 1-4 and the blocker RFID tag 5. It further comprises a data storage device 10 and is designed for running programs, which are in the following described by the flow charts of the FIGS. 2 and 3. For this reason, it comprises respective data processing means.

A first program (FIG. 2) may be started at regular intervals in a step S1, in which certain parameters may be initialized. In a step S2, also referred to as first step, a random identifier RAN_ID with a given bit length BL is created. This step can be performed by a random identifier creator, being implementable in hardware, software or any mix thereof. The given bit length may, for example, be a first bit length, which may by way of example be, for example, 50 bits. It may, however, also be larger or smaller, for example, 16 or 64 bits. For creating the random identifier RAN_ID, preferably a random number generator is provided.

In a step S4, a request REQ is transmitted via the antenna 8 to the present regular RFID tags 1 to 4 and the blocker RFID tag 5 to respond, if their respective identifier matches the random identifier RAN_ID. It is important to note here, that the random identifier RAN_ID may be, depending on the given bit length BL, be just part of the full identifier of the respective RFID tags. The regular RFID tags 1 to 4 are designed to respond only if their respective identifier matches the random identifier RAN_ID. However, blocker RFID tag 5 may respond always or just to selective identifiers. This step is referred to as a second step and it can be performed by a requestor, being implementable in hardware, software or any mix thereof.

In a step S6, it is determined whether a collision COLL of responses is detected. This collision may take place if two RFID tags respond at the same time with different bit values "0" and "1". Such a collision may also take place if the blocker RFID tag 5 is designed for simultaneously transmitting bits of value "0" and "1". If a collision has been detected in step S6, the bit length of the random identifier RAN_ID created in step S2 may be modified by an additional bit length BL_ADD and in this way just the additional bits may be added with a random value to the already existent random identifier RAN_AD in step S8. The step S4 is again processed. The iterations through the step S8 should be limited to, at maximum, reaching the bit length BL of a full bit length of the full identifier. For that reason, the condition in step S6 may independently form whether a collision COLL is detected be not fulfilled, if the bit length BL of the random identifier RAN_ID has reached the full bit length.

If the condition of step S6 is not fulfilled, then in a step S10 it is checked whether a response RESP has been received upon the request REQ of step S4. This step is referred to as a third step and it can be performed by a determinator, being implementable in hardware, software or any mix thereof.

If the condition of step S10 is true, the program proceeds to step S12 and sets a blocker RFID tag marker BT on a true value TRUE. This is based on the assumption that the probability of the regular RFID tag 1-4 responding to the random identifier RAN_ID is fairly low. In the case of a bit length BL of 64, the probability is, for example, only $2^{-64}$. If, however, the condition of step S10 is not fulfilled, the program proceeds to a step S16, where the blocker RFID tag marker BT is marked with a false value FALSE. The program may be terminated after steps S10 and S16.

In an alternative embodiment, the program may proceed to step S18, when the condition of step S10 is fulfilled. In the step S18, a blocker RFID tag marker within a blocker RFID tag marker array BT[ ], which position within the array is determined by a counter CTR, is given the true value TRUE and, respectively, in a step S22, a respective false value FALSE is assigned, if the condition in step S10 is not fulfilled. After that, in a step S20, the counter CTR is incremented and it is checked whether the counter has a value higher than a maximum value CTR_MAX. If this is not the case, then the program proceeds again to step S2. It is possible that it first proceeds to a step S24 where the first bit length BL1 may be varied, for example, depending on the counter CTR. After step S24, the program then proceeds to step S2.

If the condition of step S20 is, however, fulfilled, then the program proceeds to a step S26, in which a true or, respectively, false value TRUE, FALSE is assigned to the blocker RFID tag marker BT depending on an amount of received or not received responses, which may, for example, be determined by evaluating the amount of true and, respectively, false values within the blocker RFID tag marker array BT[ ]. For this purpose, a threshold may be given for the amount of true values in order to allocate the true value to the blocker RFID tag marker BT. The program is then terminated in the step S14.

If the blocker RFID tag marker BT has been allocated the true value TRUE, the reader unit 6 may, for example, signal the presence of the blocker RFID tag in order to enable to physically identify the blocker RFID tag 5 and to remove it.

Figure 2:
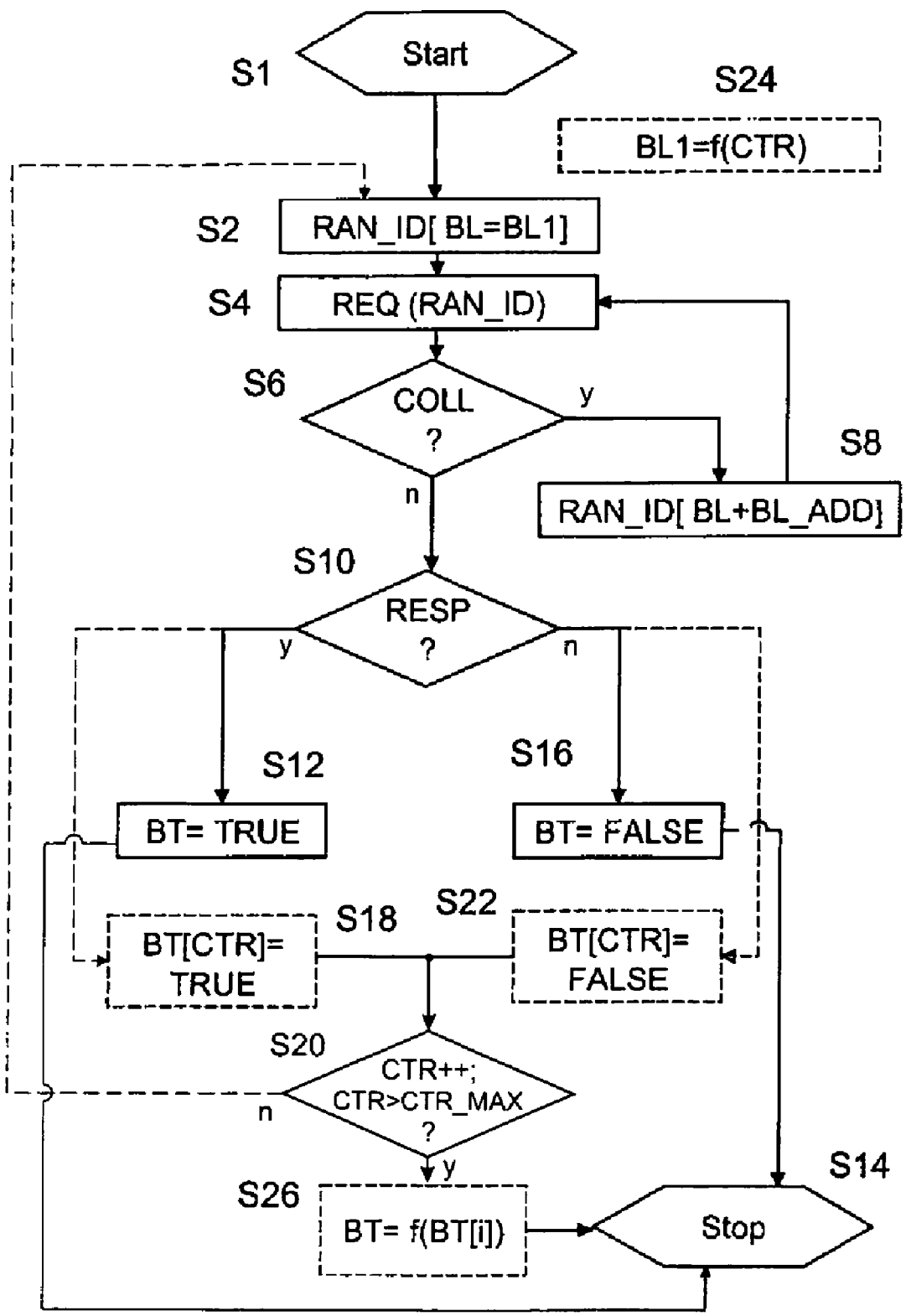
FIG. 2 shows a flow chart for determining the presence of a blocker RFID tag.

The program according to FIG. 2 may also be modified in a way that steps S6 and S8 are not present and the program proceeds directly from step S4 to step S10. In this case, also a collision may be interpreted as the response RESP.

Figure 3:
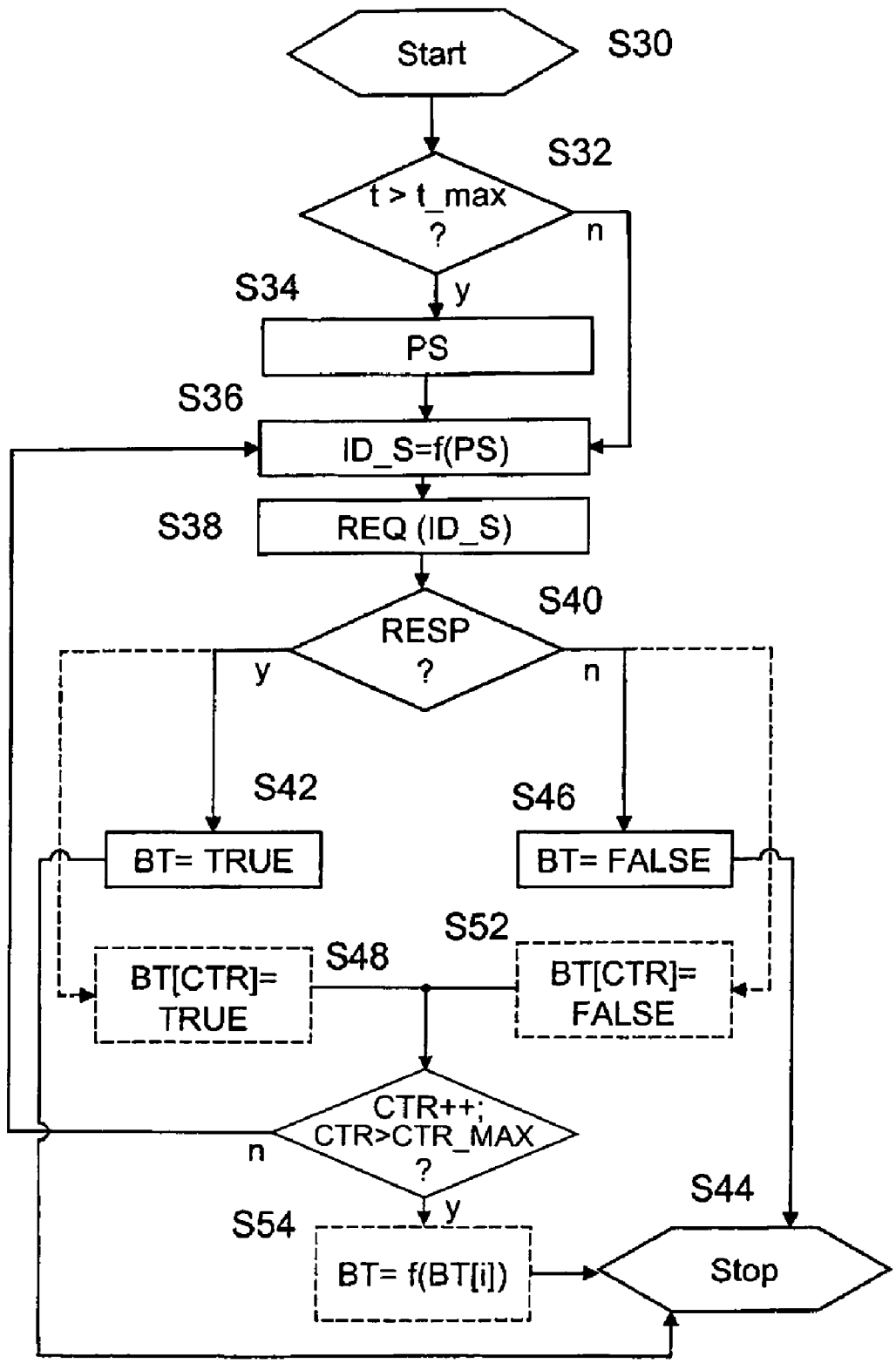
FIG. 3 shows a further flow chart for detecting the presence of the blocker RFID tag.

In a second embodiment of the program according to FIG. 3, the program is started in a step S30. In this step S30, certain variables may be initialized. In a step S32, it is checked whether a given time t is greater than a maximum time value t_max. If this is the case, then the program proceeds to a step S34. In the step S34, a given probing set PS of identifiers, which are not being used as identifiers for a given set of RFID tags, is stored in the data storage device 10. The probing set PS therefore only comprises identifiers which the manufacturer has decided upon not to use as valid identifiers for the objects he wants to mark with the regular RFID tags 1 to 4. A probing set PS stored in the data storage device 10 is preferably just a subset of all of the by manufacturer as invalid classified identifiers. In this way, memory space may be saved and also a spying out of all of the respective identifiers may be prevented. Preferably the stored probing set PS is larger than a number of identifiers being possibly stored in said blocker RFID tag 5.

An update of the probing set PS may in step S34 be accomplished by establishing a communication connection to, for example, a back-end database, which then provides the probing set PS. Preferably, the probing set PS is changed whenever the new probing set PS is queried from the back-end database. In a simpler embodiment, however, the probing set PS may be stored in the data storage device 10 and not be updated after the given time t exceeds the maximum time value t_max.

In a step S36, a selected identifier ID_S is selected from the probing set PS. This step is referred to as a first step and it can be performed by a selector, being implementable in hardware, software or any mix thereof. The selected identifier ID_S may, for example, be randomly selected from the probing set PS. It is to be noted here that the selected identifier ID_S may have a bit length that is different to the full bit length of the full identifier for the tags. In step S38, a request REQ to response is transmitted via the antenna to all RFID tags being present asking them to answer only if their respective identifier matches the selected identifier ID_S. In step S40, it is then checked whether the response RESP has been received by some or one of the identifier RFID tags. If a response is received in step S40, then the blocker RFID tag marker BT is set on the true value TRUE in step S42. This is based on the fact, that none of the regular RFID tags 1 to 4 would respond to the request transmitted in step S38. Therefore, it is reasoned that a response may only come from the blocker RFID tag 5.

If, however, the condition of step S40 is not fulfilled, then the blocker RFID tag marker BT is assigned the false value FALSE in a step S46. After steps S42 and S46, the program is terminated in a step S44. Actions taken by the reader unit 6 may be the same as the embodiment of the program according to FIG. 2. Steps 48, 52, 50, and 54 correspond to the steps S18, S22, S20, and S26.

Any disclosed embodiment may be combined with one or several of the other embodiments shown and/or described. This is also true for one or more features of the embodiments. The present invention can be realized in hardware, software, or a combination of hardware and software. It may be implemented as a method having steps to implement one or more functions of the invention, and/or it may be implemented as an apparatus having components and/or means to implement one or more steps of a method of the invention described above and/or known to those skilled in the art. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods. Methods of this invention may be implemented by an apparatus which provides the functions carrying out the steps of the methods. Apparatus and/or systems of this invention may be implemented by a method that includes steps to produce the functions of the apparatus and/or systems.

Computer program means or computer program in the present context include any expression, in any language, code or notation, of a set of instructions intended to cause a system having an information processing capability to perform a particular function either directly or after conversion to another language, code or notation, and/or after reproduction in a different material form.

Thus the invention includes an article of manufacture which comprises a computer usable medium having computer readable program code means embodied therein for causing one or more functions described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

The invention claimed is:

1. A method for detecting a blocker RFID tag comprising
  a first step of creating a random identifier of a given bit length,
  a second step of requesting a response from all RFID tags having an identifier matching said random identifier,
  a third step of determining, depending on receiving or not receiving a response, whether a blocker RFID tag is present, and
  implementing said first step by creating said random identifier with a given first bit length, conducting said second step, upon receiving said response signaling a collision of at least two RFID tags creating a modified random identifier by adding a given amount of bits having a random value, conducting again said second step with said modified random identifier and conducting said third step for determining, depending on receiving or not receiving said response, whether said blocker RFID tag is present.

2. A method according to claim 1, comprising repeatedly conducting said first and said second steps and in said third step determining, depending on an amount of received or not received responses, whether said blocker RFID tag is present.

3. A method according to claim 1, comprising repeatedly conducting said first and said second steps while varying said given bit length.

4. An article of manufacture comprising a computer usable medium having computer readable program code means embodied therein for causing detection of a blocker RFID tag, the computer readable program code means in said article of manufacture comprising computer readable program code means for causing a computer to effect the steps of claim 1.

5. A method for detecting a blocker RFID tag, comprising:
  a first step of selecting one identifier out of a probing set being stored on a data storage device, said probing set comprising identifiers, which are not being used as identifiers for a given set of RFID tags,
  a second step of requesting a response from all RFID tags having an identifier matching said selected identifier and
  a third step of determining, depending on receiving or not receiving said response, whether said blocker RFID tag is present, and wherein said probing set is a subset of all identifiers which are not being used as identifiers for said given set of RFID tags.

6. A method according to claim 5, comprising repeatedly conducting said first and second steps and said third step of determining, depending on an amount of received or not received responses, whether said blocker RFID tag is present.

7. A method according to claim 5, comprising storing a modified probing set of identifiers, which are not being used as identifiers for a given set of RFID tags, when a given time-related condition is fulfilled.

8. A method according to claim 5, with said probing set comprising a given number of identifiers being larger than a number of identifiers being possibly stored in said blocker RFID tag.

9. A program storage device readable by machine, tangibly embodying a program of instructions executable by the machine to perform method steps for detecting a blocker RFID tag, said method steps comprising the steps of claim 5.

10. A device for detecting a blocker RFID tag comprising:
a random identifier creator for creating a random identifier of a given bit length,
a requestor for requesting a response from all RFID tags having an identifier matching said random identifier, and
a determinator for determining, depending on receiving or not receiving a response, whether a blocker RFID tag is present, and the device being designed for creating said random identifier with a given first bit length, conducting said requesting a response from all RFID tags having an identifier matching said random identifier, upon receiving said response signaling a collision of at least two RFID tags responding simultaneously modifying said random identifier by adding a given amount of bits having a random value, conducting said requesting a response from all RFID tags having an identifier matching said random identifier with said modified random identifier and conducting said determining, depending on receiving or not receiving said response, whether said blocker RFID tag is present.

11. A device according to claim 10, being designed for repeatedly conducting said creating a random identifier of a given bit length, said requesting a response from all RFID tags having an identifier matching said random identifier and said determining depending on an amount of received or not received responses whether said blocker RFID tag is present.

12. A device according to claim 10, being designed for repeatedly conducting said creating a random identifier of a given bit length and said requesting a response from all RFID tags having an identifier matching said random identifier while varying said given bit length.

13. A computer program product comprising a computer usable medium having computer readable program code means embodied therein for causing functions of a device for detecting a blocker RFID tag, the computer readable program code means in said computer program product comprising computer readable program code means for causing a computer to effect the functions of claim 10.

14. A device for detecting a blocker RFID tag, comprising:
a selector for selecting one identifier out of a probing set being stored on a data storage device, said probing set comprising identifiers, which are not being used as identifiers for a given set RFID tags,
a requestor for requesting a response from all RFID tags having an identifier matching said selected identifier and
a determinator for determining, depending on receiving or not receiving said response, whether said blocker RFID tag is present, with said probing set being a subset of all identifiers which are not being used as identifiers for said given set of RFID tags.

15. A device according to claim 14, being designed for repeatedly conducting said selecting one identifier out of a probing set being stored on a data storage device, said requesting a response from all RFID tags having an identifier matching said selected identifier and said determining, depending on an amount of received or not received responses, whether said blocker RFID tag is present.

16. A device according to claim 14, being designed for storing a modified probing set of identifiers, which are not being used as identifiers for a given set of RFID tags, when a given time-related condition is fulfilled.

17. A device according to claim 14, being designed for said probing set comprising a given number of identifiers being larger than a number of identifiers being possibly stored in said blocker RFID tag.

18. A computer program product comprising a computer usable medium having computer readable program code means embodied therein for causing functions of a device for detecting a blocker RFID tag, the computer readable program code means in said computer program product comprising computer readable program code means for causing a computer to effect the functions of claim 14.

* * * * *